United States Patent [19]

Burghart

[11] 4,260,051

[45] Apr. 7, 1981

[54] VIBRATORY CONVEYOR SYSTEM WITH COUNTER VIBRATION COMPONENT AND NON-VIBRATING SUPPORT

[76] Inventor: George L. Burghart, 2993 Curtiss, Lot 45B, Des Plaines, Ill. 60018

[21] Appl. No.: 13,452

[22] Filed: Feb. 21, 1979

[51] Int. Cl.³ .............................................. B65G 27/30
[52] U.S. Cl. .................................... 198/760; 198/763; 198/769
[58] Field of Search ............... 198/760, 763, 764, 766, 198/767, 769, 770

[56] References Cited

U.S. PATENT DOCUMENTS

| | | | |
|---|---|---|---|
| 2,664,995 | 1/1954 | Renner | 198/760 |
| 2,797,796 | 7/1957 | Carrier et al. | 198/760 |
| 3,019,889 | 2/1962 | Carrier | 198/760 |
| 3,042,093 | 7/1962 | Hesse et al. | 198/760 X |
| 3,291,289 | 12/1966 | Savage | 198/760 |
| 3,965,648 | 6/1976 | Tedesco | 198/769 X |

FOREIGN PATENT DOCUMENTS 177112 12/1953 Austria ....................................... 198/763
380566 6/1973 U.S.S.R. ..................................... 198/763

*Primary Examiner*—Jeffrey V. Nase
*Attorney, Agent, or Firm*—Darbo & Vandenburgh

[57] ABSTRACT

A dynamically balanced vibratory conveyor system for conveying or feeding particulate material. The system comprises a horizontal trough, a counterweighting frame positioned adjacent to and generally coextensive with the trough, and a plurality of spaced, resilient elements interconnecting the trough and the frame. A driving device is connected between the trough and the frame to drive both the trough and the frame in reciprocating movement in opposed relative directions. The entire system is supported by a pair of trunnions or similar means which is connected to the resilient elements at a vibrationally neutral position so that practically no vibration is transmitted to the structure which supports the system.

6 Claims, 9 Drawing Figures

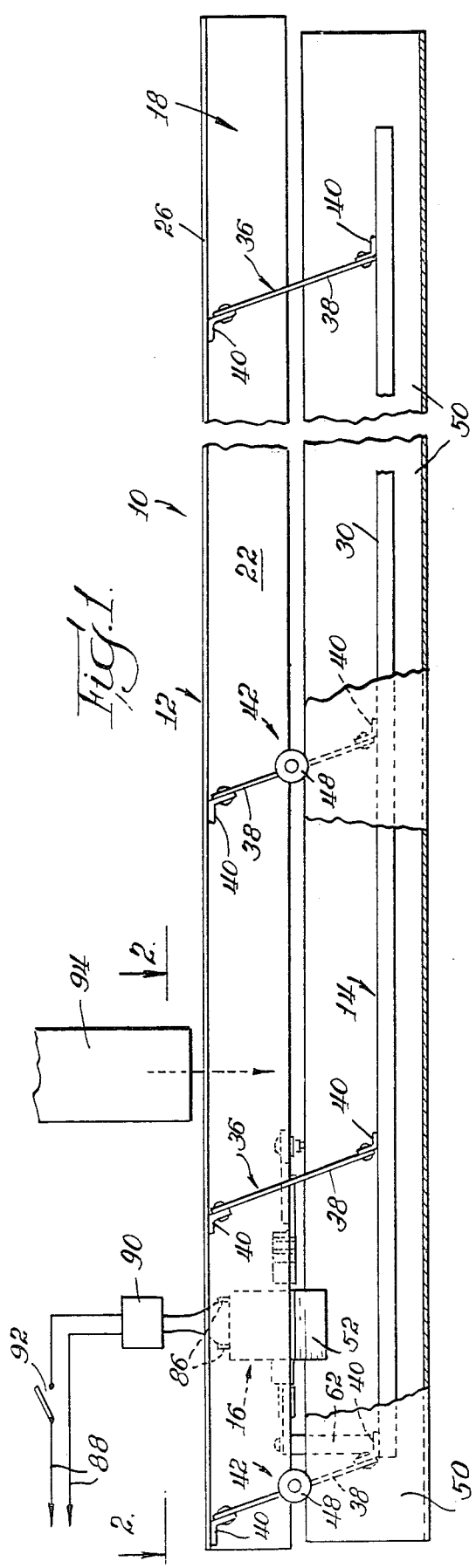
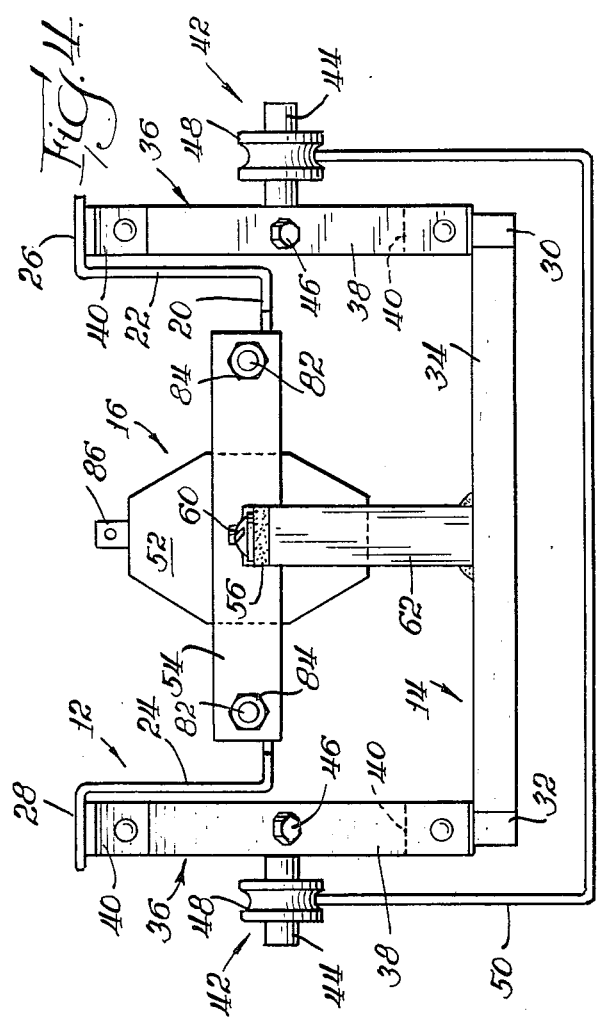
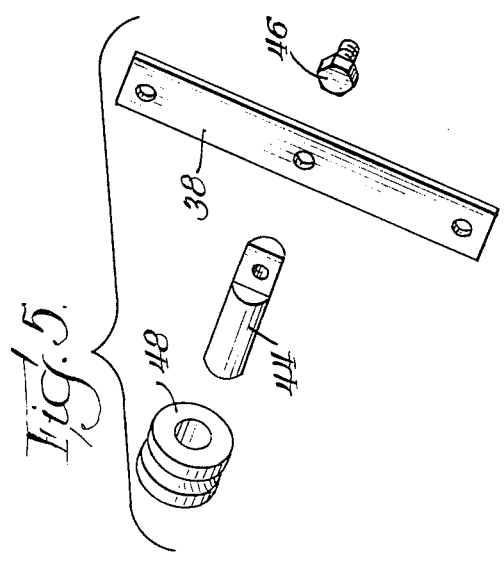

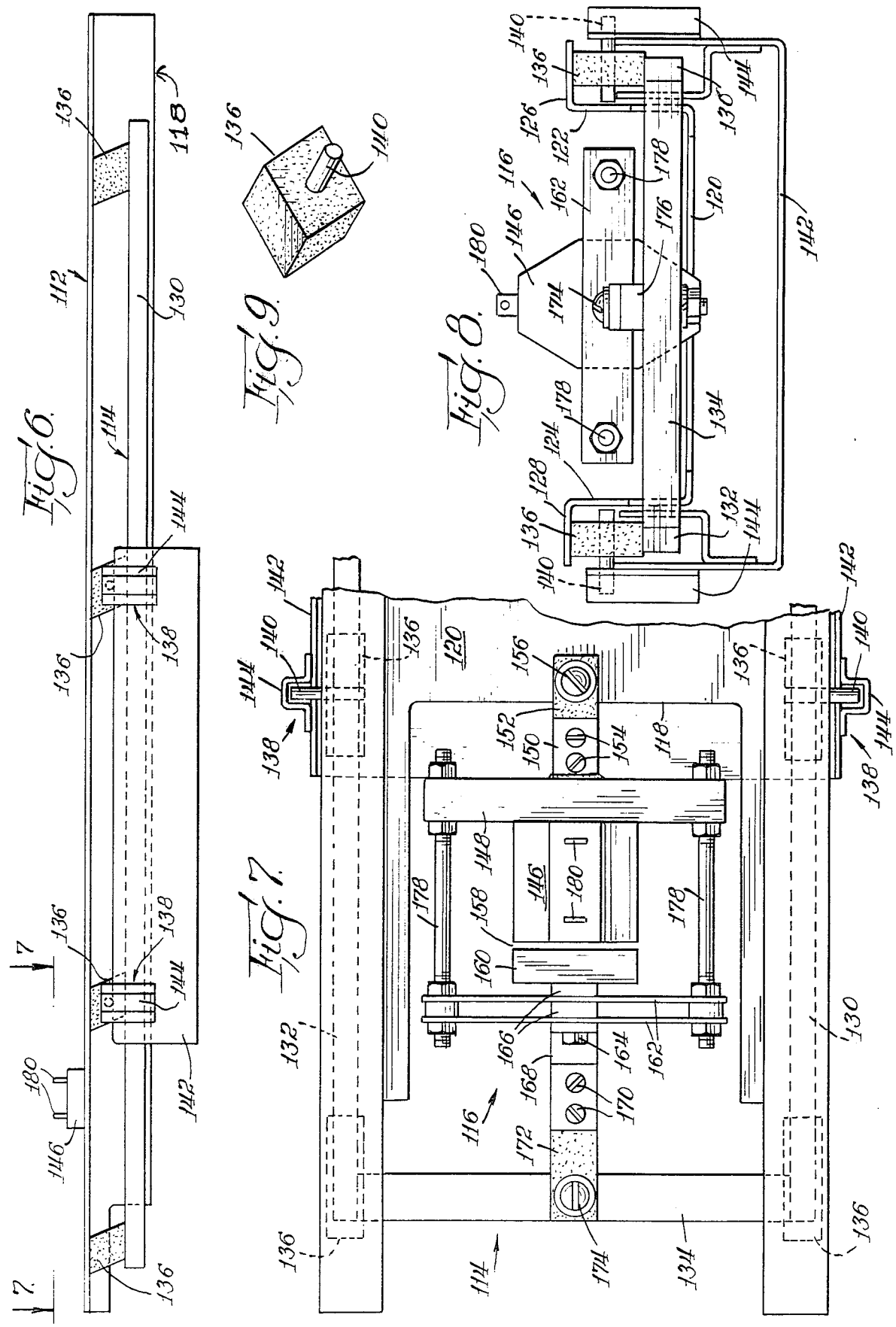

VIBRATORY CONVEYOR SYSTEM WITH COUNTER VIBRATION COMPONENT AND NON-VIBRATING SUPPORT

DESCRIPTION OF THE INVENTION

1. The Background

This invention relates to vibratory conveyor, including feeding, systems, and more particularly to a dynamically balanced vibratory conveyor system.

Vibratory conveyor systems are extensively used in industry to convey particulate material from one location to another. A typical vibratory conveyor system of the prior art is composed of a conveyor trough, a static base, and a reciprocating drive attached between the static base and the trough. The base may itself be a very heavy body or it may be mounted on a floor or any structural part of a building of sufficient mass to withstand vibration of the trough. Often the base is supported on isolater pads or springs.

A substantial disadvantage of the prior art vibratory conveyors is that, since the base is depended upon to withstand the vibratory action of the feeder trough, a massive base must be utilized to absorb the inertia of the vibrating trough and the reaction forces of the driving motor. In addition, isolater pads or springs must usually be used to dampen vibration impinging upon the static base in order to avoid translation of vibration to the surrounding building structure, causing noise and possible damage to the building due to the continuous vibratory action of the conveyor system.

2. The Invention

The present invention overcomes the above disadvantages of the prior art and others by providing a vibratory conveyor system having a weighted component and a counterweighted component which are mutually dynamically balanced, thereby eliminating the undesirable effect of reaction forces and oppositional inertia and thus, the need for a massive, fixed base.

The vibratory conveyor system of the invention includes a material conveying component, a counterweighting component, and means resiliently interconnecting the material conveying and counterweighting components. A driving means is connected between the material conveying and counterweighting components to reciprocally drive the components in opposed relative directions. The conveying and counterweighting components and driving means are supported at a vibrationally neutral position so that the support of the system, itself, is nonvibratory.

The material conveying component is comprised of an elongated trough and the counterweighting component is comprised of a rigid frame positioned adjacent to and generally coextensive with the elongated trough. In the embodiments shown by way of example herein, the counterweighting component extends along under the conveying component. The resilient interconnecting means is composed of a plurality of semi-rigid connecting elements spaced apart between the trough and the rigid frame. In one embodiment of the invention, the connecting elements are strips of resilient material, such as spring steel, comprising struts, each having one end attached to the trough and the other end attached to the frame. For reasons that are well known, the struts are disposed at an acute angle to the vertical. In another embodiment of the invention, the connecting elements are composed of resilient blocks, such as blocks of rubber, one end of each block being attached to the trough and the opposite end of each block being attached to the frame.

As will be seen as the description of the invention proceeds, the dynamic balancing of the vibrator conveyor system results in the establishment of a point on each component's interconnecting elements which is vibrationally neutral, i.e., at which there is no significant movement when the system is in operation. In order to eliminate transmission of vibration from the conveyor system to surrounding structure and environment, the conveyor system is supported at these vibrationally neutral positions. Trunnions mounted upon at least two, and usually four or more, of the connecting elements at vibrationally neutral positions thereon serve to support the vibration conveyor system upon a static base of sufficient strength to bear the weight of the components of the conveyor system and its contents.

In the exemplary embodiments herein described, the rigid frame of the counterweighting component is constructed of a pair of metal bars located along opposite sides of the conveyor trough and one or more crossbars positioned transversely between and affixed to the bars to assure sufficient rigidity.

The driving means is connected between a crossbar of the counterweight frame and the conveyor trough. In the primary embodiment of the invention, the driving means is comprised of a periodically actuated electromagnet attached to one of either the trough or the rigid frame and a ferrous armature attached to the other of the trough or the rigid frame. The armature, which along with the electromagnet provides a motor, is located in known manner in sufficient proximity to the electromagnet to be attracted to the magnet as it is periodically actuated. Spring means is provided to return the armature to starting position.

Greater detail of the form of the invention and novel features of the structure will become apparent from the drawings of the invention and the detailed description following.

DESCRIPTION OF THE DRAWINGS

The invention is depicted in the drawings, in which:

FIG. 1 is a side elevational view of the vibratory conveyor system according to the invention, portions being removed for better illustration;

FIG. 4 is an enlarged left end view of the system shown in FIG. 1;

FIG. 5 is an exploded view of the conveyor trough/counterweight frame interconnecting means;

FIG. 6 is a side elevational illustration of a second embodiment of the invention;

FIG. 7 is an enlarged top plan illustration of the structure of FIG. 6 taken along the line 7—7 thereof;

FIG. 8 is an enlarged left end view of the structure shown in FIG. 6, and

FIG. 9 is an enlarged perspective view of the component interconnecting means of the system shown in FIG. 6.

DESCRIPTION OF EXAMPLES EMBODYING BEST MODE OF THE INVENTION

Figure 2:
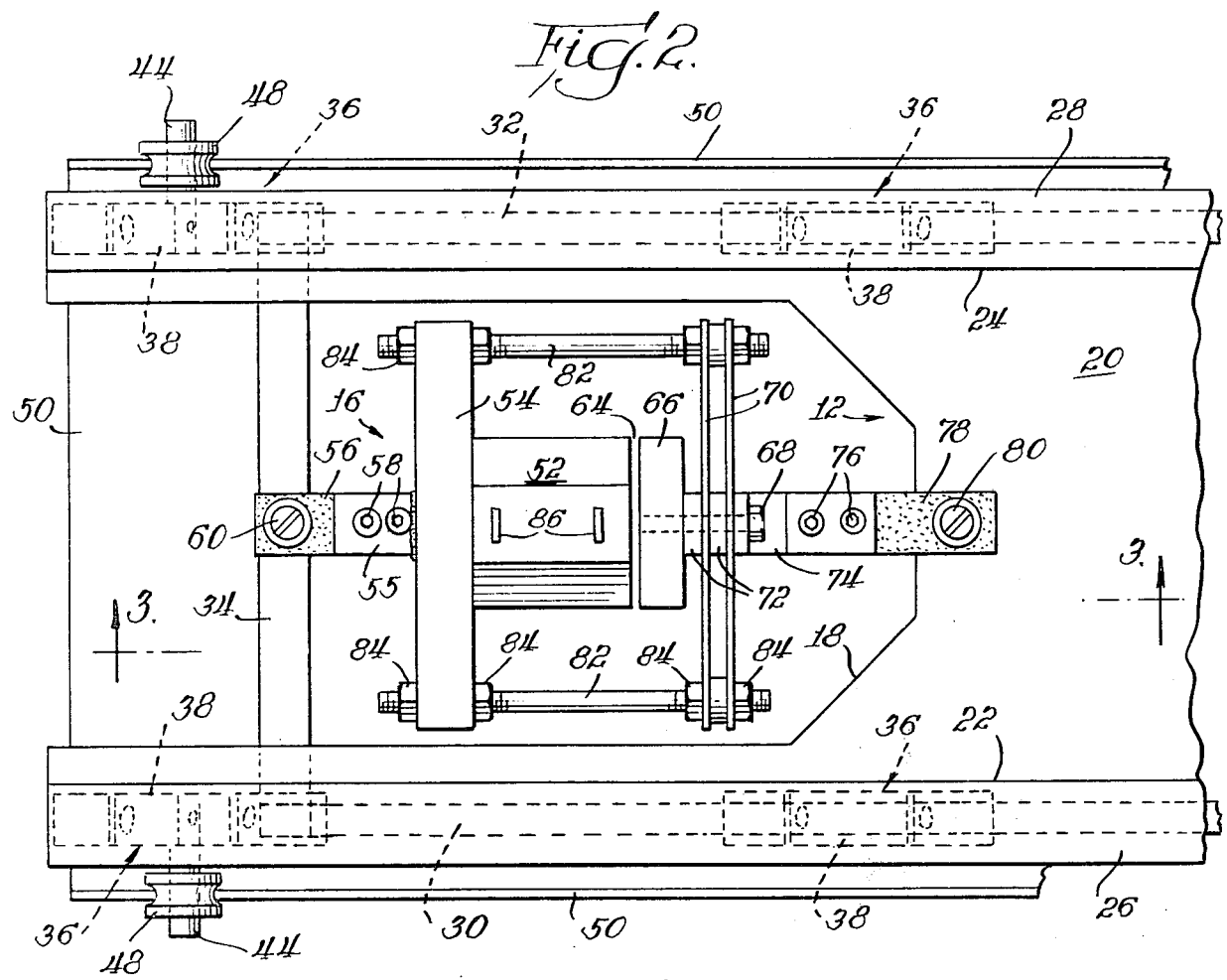
FIG. 2 is an enlarged, top plan view of a portion of FIG. 1 taken at line 2—2 thereof.

Turning to the first embodiment of the invention illustrated in FIGS. 1-5, the vibratory conveyor system is depicted generally at 10. Primary elements of the invention are a material conveying component 12, a counterweighting component 14, and a driving means 16.

The material conveying component 12 is composed of a trough 18 having a flat bottom 20 and opposed upstanding sidewalls 22 and 24. Support flanges 26 and 28 extend outwardly from the respective sidewalls 22 and 24. The length and width of the trough 18 are determined by the quantity of material to be handled by the system 10 and distance the material is to be transported.

The counterweighting component 14 is comprised of a rigid frame having a pair of spaced bars 30 and 32 located at opposite sides of and below the trough 18. At least one crossbar 34 is located transversely between and rigidly affixed to the bars 30 and 32.

Figure 3:
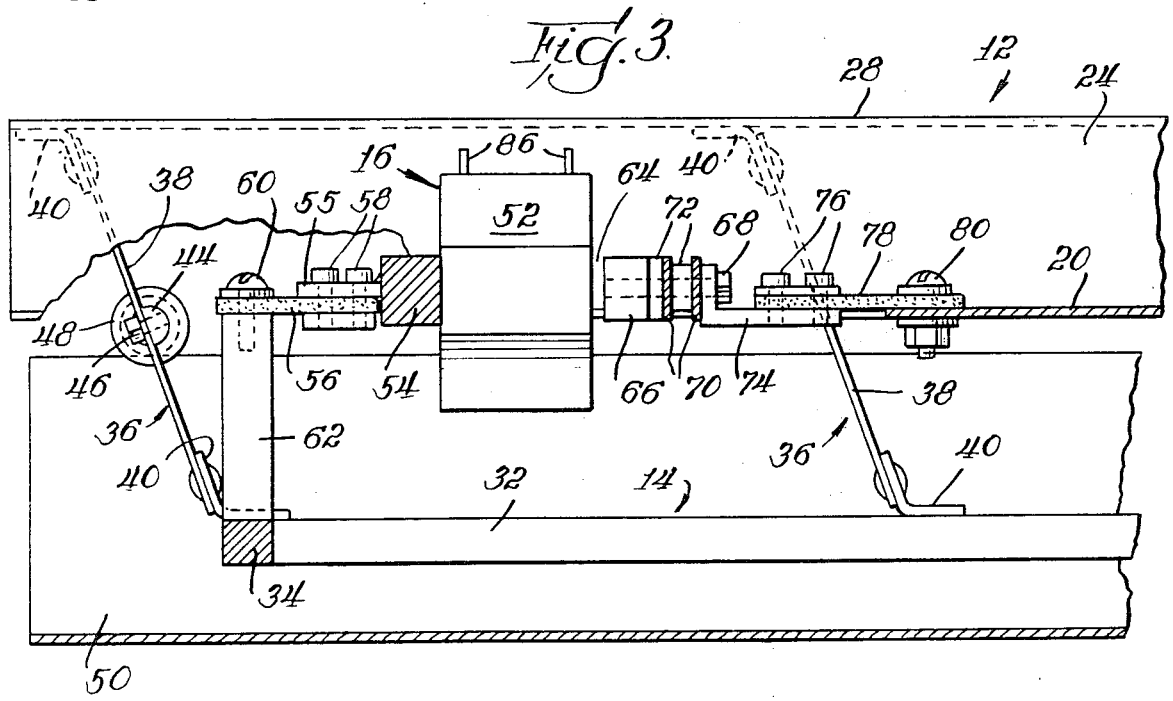
FIG. 3 is a cross-sectional illustration taken along line 3—3 of FIG. 2, with portions removed for clarity.

As best shown in FIGS. 1, 3 and 4, the conveyor trough 18 and bars 30 and 32 of the counterweighting component 14 are interconnected by a plurality of struts 36. Each of the struts 36 is composed of a resilient strip 38 of suitable material, such as spring steel, attached between a flange 26 or 28 and its associated bar 30 or 32. Braces 40, connected to opposite ends of each strip 38, are used to attach the strips to the respective flanges 26 or 28 and associated bars 30 or 32. Alternatively, the braces 40 may be omitted and the strips 38 may be welded, bolted, or otherwise attached directly to the flanges 26 or 28 and bars 30 or 32. Likewise, although the strips 38 are shown riveted to the braces 40, welding, bolting, or other suitable attachment means may be employed. The strips are disposed at an acute angle to the vertical, as shown, for reasons which will be described below.

In accordance with the invention, the material conveying component 12 and the counterweighting component 14 are relatively mounted and driven simultaneously in reciprocation in opposed directions, each component being free to vibrate responsive to the electromagnetic driving motor. No attempt is made to restrain the vibration of either component. Furthermore, in order to eliminate translation of vibration from the vibrating system of the invention to surrounding structure and environment, the material conveying component 12 and counterweighting component 14 may be supported in fixed structure at substantially vibrationally neutral positions of the system.

As best illustrated in FIGS. 1 and 4, the components 12 and 14, making up the vibrating system, are isolated from the supporting structure of the conveyor system 10, being suspended by a plurality of trunnions 42. At least two, and preferably four or more, of the trunnions 42 must be used to adequately support the components 12 and 14.

Each of the trunnions 42 includes a short pin 44 attached to the center of a strip 38 by a suitable bolt 46. An annular elastomeric grommet 48 is located on each pin 44 to dampen any spurious vibration which may be transmitted to the pin 44 through the strips 38.

The trunnions 42 rest upon a static base 50. The base 50 in turn may rest directly upon a building floor, or it may be situated upon adjustable legs (not illustrated) to facilitate ease in raising and lowering the height of the conveyor system. Although the static base 50 as shown in the drawings is a single, continuous member, it should be evident that a series of posts or pedestals may be substituted, one at each of the trunnions 42.

The driving means 16 is connected solely between the material conveying component 12 and the counterweighting component 14 to reciprocally drive the components in opposed relative directions. As best shown in FIGS. 2 and 3, the driving means is comprised of an electromagnet 52 affixed to a crossbar 54 having an affixed tongue 55 which in turn is attached to a flexible tie bar 56 by a pair of screws 58. An additional screw 60 affixes the tie bar 56 to a post 62 welded to the crossbar 34.

An air gap 64 separates the electromagnet 52 from a ferrous armature 66. A bolt 68, passing through a pair of leaf springs 70 and a series of spacers 72, attaches the armature 66 to the springs 70. The springs 70 serve to return the armature 66 to its rest position as shown in FIGS. 2 and 3 when the system is operated, as described below. The bolt 68 also passes through an upstanding flange of a bracket 74 which is attached by screws 76 to a flexible tie bar 78. Lastly, a machine screw 80 affixes the tie bar 78 to the bottom 20 of the trough 18.

To provide for adjustment of the air gap 64, the crossbar 54 and leaf springs 70 are interconnected by a pair of tie rods 82. Each end of each tie rod 82 is threaded, one end passing through an aperture in the leaf springs 70, and the other end passing through an aperture in the crossbar 54. Nuts 84 are engaged on the threaded ends of the tie rods 82 to retain proper spacing between the crossbar 54 and leaf springs 70 and determine the air gap 64.

The electromagnet 52 is energized by electrical current provided through a pair of terminals 86. The current is provided from a source (not illustrated) via a pair of wires 88 through a half-wave rectifier 90 (FIG. 1) to the terminals 86. The half-wave rectifier 90 allows alternating electrical current to activate the electromagnet 52 for half a cycle, attracting the armature 66 for this half cycle. For the remaining half cycle, the leaf springs 70 return the armature 66 to its rest position. For sixty cycle alternating current, this procedure is repeated sixty times each second. If desired, as shown, a switch 92 can be used to actuate the electromagnet 52.

When the conveyor system is operated, the electromagnet 52 and associated linkage attaching it to the crossbar 34, vibrate in unison with the counterweighting component 14. This portion of the system 10 may be termed the counterweighted portion. Likewise, the ferrous armature 66, linked to the bottom 20 of the trough 18, vibrates in unison with the material conveying component 12. This portion of the invention may be termed the weighted portion. Conveyed material is conducted along the trough 18 from the point of entry upon the trough to its outlet on the right end (FIG. 1). Since the entire conveyor system is freely suspended upon the trunnions 42, the weighted portion vibrates in opposed relationship to the counterweighted portion. If the total mass of the weighted portion is equal to that of the counterweighted portion, then as the two portions are vibrated in opposite directions, the center of each of the strips 38 will be vibrationally neutral; that is, at this position, the strips will be stationary. Therefore, as depicted in this embodiment of the invention, the trunnions 42 are attached to the strips 38 at the vibrationally neutral positions. When the electromagnet 52 is periodically energized by alternating current passing through the half-wave rectifier 90, the point of location of the trunnions 42 on the strips 38 become a node or fulcrum of the vibrational movement. Thus a very minimum of vibration is transmitted through the trunnions 42 to the static base 50.

As noted above, if the masses of the weighted and counterweighted portions are equal, then the node or fulcrum of vibrational movement is the center of the strips 38. If the masses are unequal, then the node or fulcrum must be located elsewhere on the strips 38. For example, since, according to Newton's law of motion $$F = M_w a_w = M_c a_c$$

where
 $M_w$ = mass of weighted portion
 $a_w$ = acceleration of weighted portion
 $M_c$ = mass of counterweighted portion
 $a_c$ = acceleration of counterweighted portion
then, if $M_w = \frac{1}{2} M_c$, $$\tfrac{1}{2} M_c a_w = M_c a_c$$

$$a_w = 2a_c$$

If $X_c$ = displacement of counterweighted portion and $X_w$ = displacement of weighted portion, then:

$$\begin{aligned} X_w &= \tfrac{1}{2} a_w t^2 \\ &= \tfrac{1}{2} \cdot 2 a_c t^2 \\ &= a_c t^2 \end{aligned}$$

while $$X_c = \tfrac{1}{2} a_c t^2$$

Thus, $$X_w = 2 X_c$$

Furthermore, assuming the length of the strip 38 from the flange 26 or 28 to the fulcrum is L and the remaining length of the strip from the fulcrum to the bar 30 or 32 is l, then by geometrical relationship:

$$X_w/L = X_c/l$$

Since $X_w = 2X_c$, then $$l = (X_c/X_w)L = \tfrac{1}{2} L$$

The fulcrum point for location of the trunnions 42 can therefore be calculated when the masses of the weighted and counterweighted portion are known.

As described above, the strips 38 are disposed at an acute angle to the vertical. When the conveyor system is operated as described above, the trough 18 must move in two directions in order to convey particulate material. As is well known in the art, as particulate material is added to the trough 18 from a source 94, the material, which is conveyed to the right in FIG. 1, must also be effectively suspended above the bottom 20 in order to overcome friction. Therefore, the trough 18 must be vibrated in both the vertical and horizontal directions. As the electromagnet 52 is periodically actuated, it periodically drives the trough 18 to the left. At the same time, since the strips 38 are disposed at an acute angle to the vertical, the trough 18 is lowered. When the electromagnet 52 is de-energized, the trough 18 returns to the right and is raised. This procedure occurs sixty times per second if the energizing electrical current is conventional sixty cycle alternating current. Hence, the angular disposition of the strips 38 accentuates vertical movement of the trough 18 to assure proper conveying of particulate material.

FIGS. 6 through 9 illustrate an alternative embodiment of the invention. As the first embodiment of FIGS. 1 through 5, this embodiment of the invention includes a material conveying component 112, a couterweighting component 114 and a driving means 116.

The material transmitting component 112, which is similar to the material conveying component 12 of the first embodiment of the invention, includes a trough 118 with a flat bottom 120 and opposed upstanding sidewalls 122 and 124. Support flanges 126 and 128 extend outwardly from the respective sidewalls 122 and 124.

In this embodiment of the invention, the counterweighting component 114 is located coextensive with the trough 118, rather than beneath the trough as depicted in the first embodiment of the invention. The counterweighting component is comprised of a rigid frame having a pair of elongated bars 130 and 132 located at opposite sides of the trough 118. A crossbar 134 is located transversely between the elongated bars 130 and 132 in an interstice in one end of the trough 118, as shown.

As in the first embodiment of the invention, the trough 118 and the bars 130 and 132 of the counterweighting component 114 are interconnected by a plurality of struts 136. In this embodiment, each of the struts 136 is composed of a parallelogrammic block of resilient, elastomeric material, such as rubber, with one end being cemented or attached to a flange 126 or 128 and the opposite end being cemented or attached to a respective bar 130 or 132.

The material conveying component 112 and the counterweighting component 114 are suspended by a plurality of supports 138 associated with at least two, and preferably four or more, of the struts 136. Each of the supports 138 includes a short trunnion 140 embedded in a strut 136. The trunnion 140 in turn rests upon a static base or support 142. A bracket 144, attached to the base 142, captures the trunnion 140 and securely retains it in its location on top the static base 142.

The driving means 116 is connected between the material conveying component 112 and the counterweighting component 114 to reciprocally drive the components in opposed relative directions. As in the first embodiment of the invention, the driving means is comprised of an electromagnet 146 affixed to a crossbar 148. A tongue 150 extends from the crossbar 148 and is attached to a flexible tie bar 152 by a pair of screws 154. In this embodiment, the tie bar 152 is affixed by a screw 156 to the bottom 120 of the trough 118.

An air gap 158 separates the electromagnet 146 from an armature 160. As in the first embodiment of the invention, the armature 160 is attached to a pair of leaf springs 162 by a bolt 164 passing through a series of spacers 166. The bolt 164 also passes through an upstanding flange of a bracket 168 which is attached by screws 170 to a flexible tie bar 172. In this embodiment, the tie bar 172 is affixed to a post 176 on the crossbar 134 by a machine screw 174. A pair of tie rods 178 provide for adjustment of the air gap 158 in the same manner as described above with regard to the first embodiment of the invention.

The electromagnet 146 is energized by electrical current provided through a pair of terminals 180. As described above with regard to FIG. 1, electrical current is provided to the terminals 180 of the electromagnet via wires passing through a half-wave rectifier (all not illustrated), thereby periodically actuating the electromagnet.

In this embodiment of this invention, the counterweighted portion of the invention is composed of the armature 160 and associated linkage attaching it to the crossbar 134, which vibrates in unison with the counterweighting component 114. The weighted portion of the invention is composed of the electromagnet 146 and associated linkage which vibrates in unison with the material conveying component 112. When the masses of the weighted and counterweighted portions are determined, the node or fulcrum of vibrational movement can be calculated in exactly the same manner as described above, and the trunnion 140 can be located at the fulcrum point to assure a minimum of transmission of vibration to the static base 142.

Various changes can be made to the invention without departing from the spirit thereof. For example, more than one electromagnet can be used to drive the vibratory conveyor system, or the electromagnet may be replaced b a reciprocating motor. Furthermore, the location of the electromagnet can be altered to the side or bottom of the conveyor trough. In addition, the counterweighting component need not be located at the sides or beneath the trough, but rather may be located thereabove. The scope of the invention is defined by the following claims.

ACHIEVEMENT

The vibratory conveyor system of the invention is a considerable improvement over former systems having a fixed base. By having a material conveying trough and a counterweighting frame which are reciprocally driven in opposed relative directions, with flexible struts extending between and interconnecting the trough and frame, the system is dynamically balanced. If the system is supported along the struts at vibrationally neutral locations, little or no vibration is transmitted from the conveyor system to the building structure. Thus, isolator pads or springs commonly used in prior art systems are unnecessary in the system of the invention.

The dynamic balancing achieved by the invention also results in considerable economy since the massive, static base formerly required by commercial vibratory conveyor systems is not required by the invention. This also leads to greater mobility of the system, since it is considerably lighter and thus more readily moved from one location to another, and noise reduction, since very little, if any, vibration is transmitted to surrounding structures.

The configuration of the system is more flexible than that of prior art systems, thus permitting installation of the conveyor system of the invention in locations where former systems could not be used. The driving motor and counterweighting frame may be located above, below or coincident with the conveyor trough as space requirements dictate, and the entire system itself can be completely suspended at the trunnions from a building ceiling or overhead support.

I claim:

1. A dynamically balanced vibratory conveyor system comprising
   a. a material conveying component comprising an elongated trough, said trough having sidewalls and horizontal support flanges extending outwardly from the top edges of said sidewalls,
   b. a counterweighting component comprising a rigid frame positioned adjacent to said elongated trough, and having a pair of horizontal bars extending on opposite sides of and coextensive with said trough above the level of the bottom of said trough,
   c. a plurality of struts resiliently interconnecting said material conveying and counterweighting components, each of said struts comprising a resilient parallelogrammic block, one end of said block being attached to one of said support flanges of said trough and the opposite end of said block being attached to one of said horizontal bars of said frame,
   d. driving means connected between said material conveying and counterweighting components to reciprocally drive said components in opposed relative directions, and
   e. means supporting said system at a substantially vibrationally neutral location upon said struts.

2. The vibratory conveyor system according to claim 1 in which said supporting means comprises a trunnion protruding from each of at least two of said struts at a vibrationally neutral position, and a static base supporting each of said trunnions.

3. The vibratory conveyor system according to claim 1 in which said rigid frame comprises at least one crossbar positioned transversely between said bars.

4. The vibratory conveyor system according to claim 3 in which said driving means is connected between one of said crossbars and said elongated trough.

5. The vibratory conveyor system according to claim 1 in which said driving means comprises a periodically actuated electromagnet attached to one of said components and an armature attached to the other of said components and spring means for urging said electromagnet and armature apart for the return stroke of each cycle.

6. A dynamically balanced vibratory conveyor system comprising:
   a. a horizontal trough for conveying material, said trough having sidewalls and horizontal support flanges extending outwardly from the top edges of said sidewalls, said trough having a driven end and a material outlet and,
   b. a counterweighting frame located adjacent to and beneath said trough, said frame comprising a pair of horizontal bars extending on opposite sides of and coextensive with said trough and above the level of the bottom of said trough, and a crossbar extending transversely between said horizontal bars beneath the driven end of said trough,
   c. a plurality of spaced, resilient struts interconnecting said trough and said horizontal bars, at least two of said struts being located respectively on opposite sides of said trough, said struts comprising resilient parallelogrammic blocks, one end of each block being attached to said trough at a support flange thereof and the opposite end of said block being attached to a horizontal bar of said frame, and said struts being inclined toward said driven end,
   d. driving means connected between the driven end of said trough and said crossbar to reciprocally drive said trough and counterweighting frame in opposed relative directions, said driving means comprising a periodically actuated electromagnet attached to said crossbar and an armature connected to said driven end, and spring means for urging said electromagnet and armature apart for the return stroke of each cycle, and e. means supporting said system at a substantially vibrationally neutral position upon said struts, said supporting means comprising a trunnion attached to each said strut, said trunnions resting upon a static bar.

* * * * *